United States Patent [19]

Isobe

[11] Patent Number: 4,752,785

[45] Date of Patent: Jun. 21, 1988

[54] RECORDING MEDIUM PACKAGE

[75] Inventor: Minoru Isobe, Tokyo, Japan

[73] Assignee: Oki Electric Industry Co., Ltd., Tokyo, Japan

[21] Appl. No.: 111,517

[22] Filed: Oct. 21, 1987

[30] Foreign Application Priority Data

Oct. 29, 1986 [JP] Japan .......................... 61-164941[U]
Jul. 21, 1987 [JP] Japan .......................... 62-110623[U]

[51] Int. Cl.[4] .............................................. G01D 15/00
[52] U.S. Cl. .................................... 346/136; 346/105;
[58] Field of Search .......... 346/150, 136, 105, 76 PH; 400/88, 207, 208, 607, 622, 624, 613

[56] References Cited

U.S. PATENT DOCUMENTS 4,143,382 3/1979 Brill et al. ............................. 400/88
4,698,646 10/1987 Satoh et al. .......................... 400/208

*Primary Examiner*—Arthur G. Evans
*Attorney, Agent, or Firm*—Wenderoth, Lind & Ponack

[57] ABSTRACT

A recording medium package for use on a heat transfer printer. The recording medium package comprises: a plurality of recording sheets, an ink ribbon having a sufficient length to print all the plurality of recording sheets and formed by coating one side of a base strip with a fusible or hot-sublimable ink or with a plurality of fusible or hot-sublimable inks of different colors in color sections arranged lengthwise in a fixed sequence; a feed spool wound with the ink ribbon; a take-up spool for winding the used portion of the ink ribbon and a cassette containing the plurality of recording sheets in a pile, rotatably supporting the feed spool and the take-up spool so that the ink ribbon is extended in front of and along the surface of the top recording sheet among the plurality of recording sheets, having an opening for exposing the top recording sheet through the ink ribbon to the thermal print head of the heat transfer printer, an ejecting opening for ejecting the recording sheets one by one therethrough, and a recess for exposing a portion of the top recording sheet to ejecting means of the heat transfer printer. The cassette comprises a recording sheet case for containing the plurality of recording sheets, and an ink ribbon case for rotatably supporting the feed spool and the take-up spool and pivotally joined at one end thereof to the recording sheet case so that the recording sheet case and the ink ribbon case can be turned relative to each other.

8 Claims, 3 Drawing Sheets

RECORDING MEDIUM PACKAGE

BACKGROUND OF THE INVENTION

1. Field of the Invention

The present invention relates to a recording medium package for use on a heat transfer printer which prints characters, patterns or images on heat transfer printing system.

2. Description of the Prior Art

Heat transfer printer print characters, patterns or images represented by printing data by supplying electric current to the so-called thermal print head thereof so as to heat the heating elements of the thermal print head selectively according to the printing data to heat-transfer a fusible or hot-sublimable ink applied to an ink ribbon to a recording sheet. The uses of heat transfer printers have progressively expanded in recent years and heat transfer printers have been applied to various purposes.

The heat transfer printer of such a kind, in general, is loaded individually with a recording sheet and an ink ribbon, and hence there is not any relation between feeding the recording sheet and changing the ink ribbon. Accordingly, a necessary amount of recording sheets and a necessary amount of ink ribbons are reserved for using the heat transfer printer.

However, it happens on occasions that the depletion or reduction of the reserve of recording sheets or ink ribbons is unnoticed. If either recording sheets or ink ribbons are depleted, the printing operation is obliged to be interrupted. That is, the heat transfer printer is unable to function for printing operation when either the recording sheet or the ink ribbon is depleted, nevertheless, the recording sheets and the ink ribbons are handled individually in supplying the same to the heat transfer printer, and hence it is possible that the heat transfer printer is unable to function due to failure in the sufficient reservation of both the recording sheets and the ink ribbons despite the heat transfer printer being free from malfunction.

Under the recent situation where heat transfer printers are used not only for business purposes but also for private purposes for producing hard copies of various information, in particular, it is possible that the individual supply of of recording sheets and ink ribbons causes deficiency in the supply of either recording sheets or ink ribbons. Furthermore, individual operations for feeding a recording sheet and for loading and changing an ink ribbon require a troublesome work.

SUMMARY OF THE INVENTION

The present invention has been made to solve the foregoing problems in the conventional heat transfer printer.

Accordingly, it is a principal object of the present invention to provide a recording medium package integrally carrying an ink ribbon and recording sheets to enable simultaneous supply of an ink ribbon and recording sheets to the heat transfer printer.

To achieve the object of the invention, the present invention provides a recording medium package integrally comprising a pile of a plurality of recording sheets, an ink ribbon coated with a fusible or hot-sublimable ink and having a sufficient length to print characters, patterns or images on the plurality of recording sheet, a feed spool wounded with the ink ribbon to feed the ink ribbon, a take-up spool for winding the ink ribbon, and a cassette accommodating the plurality of recording sheets, the ink ribbon, the feed spool and the take-up spool so that the ink ribbon extends between the feed spool and the take-up spool along the surface of the pile of the plurality of recording sheets to enable the transfer of the ink from the ink ribbon to the top recording sheet.

When the recording medium package of the present invention is loaded in the printing station of a heat transfer printer, the ink ribbon is located opposite to the thermal print head of the heat transfer printer. The thermal print head heat-transfers the ink of the ink ribbon selectively according to printing data to the top recording sheet to print characters, images or patterns on the recording sheet.

After the printing operation has been accomplished, the printed recording sheet is ejected from the cassette by the ejecting means of the heat transfer printer or is taken out by hand from the cassette, and then the feed spool and the take-up spool are rotated by the driving mechanism of the heat transfer printer to feed the ink ribbon by a necessary length. A cycle of the printing operation, the recording sheet ejecting operation and the ink ribbon feeding operation is repeated until all the recording sheet contained in the cassette are printed. After all the recording sheets contained in the cassette have been printed, the cassette is removed from the printing station, and then a new recording medium package is loaded in the printing station.

According to the present invention, a plurality of recording sheets and an ink ribbon having a sufficient length to print all the plurality of recording sheets are accommodated in a single cassette so that the ink of the ink ribbon can be transferred to the recording sheets by the thermal print head of the heat transfer printer, and hence both the recording sheets and the ink ribbon capable of printing operation due to the depletion of either the recording sheets or the ink ribbon is avoided.

Furthermore, since the recording sheets and the ink ribbon are accommodated in the cassette, the handling of the recording sheets and the ink ribbon is facilitated, and thereby the accessibility of the heat transfer printer is improved.

Furthermore, the recording medium package can be applied, similarly to the photographic paper package for the instant camera, to a picture taking system which comprises, in combination, a heat transfer printer and a picture taking means such as a camera and is capable of converting an image into electric signals and reproducing the image according to the electric signals in a print by the heat transfer printer immediately after taking the image. In such an application, the heat transfer printer need not be shielded from light only when the recording medium package is protected from exposure to intense heat, which facilitates using such a picture taking system under natural radiation. The above and other objects, features and advantages of the present invention will become apparent from the following description taken in conjunction with the accompanying drawings.

DESCRIPTION OF THE PREFERRED EMBODIMENT

Figure 1:
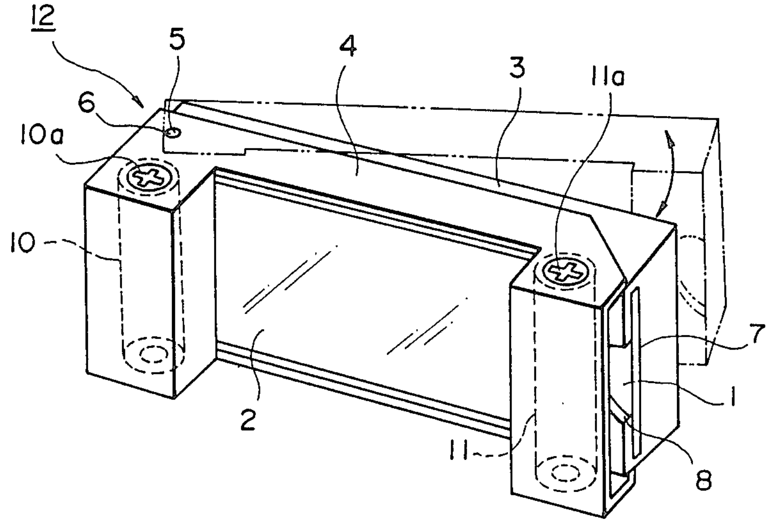
FIG. 1 is a perspective view of a recording medium package, in a first embodiment, according to the present invention.

Preferred embodiments of the present invention will be described hereinafter with reference to FIGS. 1 to 5, wherein like reference numerals designate like or corresponding parts throughout.

First Embodiment

Figure 2:
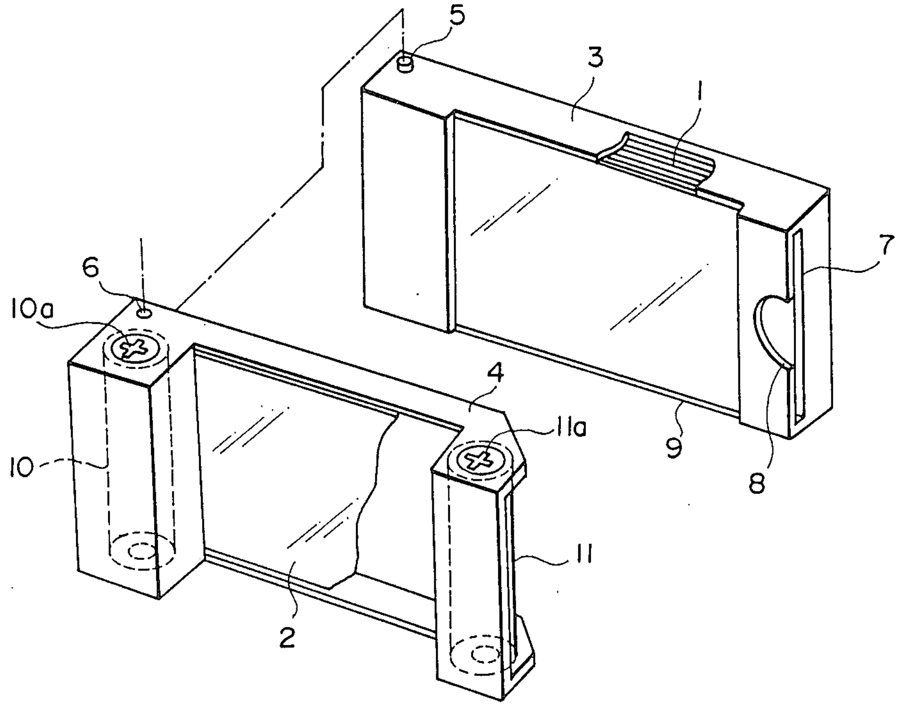
FIG. 2 is an exploded perspective view of the recording medium package of FIG. 1.

Referring to FIGS. 1 and 2, there are shown a plurality of recording sheets 1 cut in a regular size, an ink ribbon 2 formed by coating one side of a base strip, for example, with a fusible ink, a recording sheet case 3 containing the recording sheets 1, and an ink ribbon case 4 containing a fed spool 10 wound with the ink ribbon 2, and a take-up spool 11 for winding the ink ribbon 2. The recording sheet case 3 is provided with a pivot 5 in the upper surface near the upper left-hand corner thereof as viewed in FIGS. 1 and 2. The pivot 5 may be provided in the lower surface near the lower left-hand corner, as viewed in FIGS. 1 and 2, of the recording sheet case 3. The pivot 5 is fitted in a hole formed in the upper surface of the upper left-hand corner, as viewed in FIGS. 1 and 2, of the ink ribbon case 4 to enable the recording sheet case 3 to turn on the pivot 5 relative to the ink ribbon case 4. The recording sheet case 3 and the ink ribbon case 4 are constructed so that the recording sheets 1 and the ink ribbon 2 are disposed for printing operation relative to each other.

The recording sheet case 3 has an ejecting slot 7 for ejecting the recording sheets 1 one by one from the recording sheet case 3 in the right-hand side wall thereof as viewed in FIGS. 1 and 2. Part of the right-hand front wall of the recording sheet case 3 is cut so as to communicate with the ejecting slot 7 to form a recess 8 through which the ejecting means such as an ejecting roller of a heat transfer printer, not shown, engages the top recording sheet 1 contained in the recording sheet case 3 to eject the same from the recording sheet case 3. An opening 9 is formed in the front wall of the recording sheet case 3 to expose the top recording sheet 1 to the ink ribbon 2. A pressing means, not shown, is provided on the inner surface of the back wall of the recording sheet case 3 to apply a predetermined pressure to the recording sheets 1 so that the recording sheets 1 are biased continually toward the opening 9.

The feed spool 10 and the take-up spool 11 are provided at the opposite ends of the ink ribbon case 4 and are supported rotatably with the respective axis thereof parallel to each other. Recesses 10a and 11a of a predetermined shape, such as cross recesses, are formed in the respective upper end faces of the feed spool 10 and the take-up spool 11, respectively. The driving members of a driving mechanism provided in the heat transfer printer engage the recesses 10a and 11a, respectively, to rotate the feed spool 10 and the take-up spool 11 in one direction. The ink ribbon 2 has one end fixed to the feed spool 10 and the other end fixed to the take-up spool 11. The ink ribbon 2 extends between the feed spool 10 and the take-up spool 11 in a length substantially corresponding to the lateral length of the recording sheets 1 so as to face the top recording sheet 1 and the thermal print head of the heat transfer printer.

Thus, the recording sheet case 3 and the ink ribbon case 4 constitute a cassette 12 for containing the recording sheets 1 and the ink ribbon 2 having a sufficient length to print all the recording sheets 1 contained in the recording sheet case 3 in a ready-to-print positional relation.

The ink ribbon 2 may be either a monochromatic color ink ribbon for monochromatic color printing or a multicolor ink ribbon for multicolor printing. For monochromatic color printing, for example, printing in black, the ink ribbon 2 is formed by coating one side of a base strip of a length corresponding to the product of the lateral length of the recording sheet 1 and the number of the recording sheets 1 contained in the recording sheet case 3 with a fusible black ink. For multicolor printing, the ink ribbon 2 is formed by coating one side of a base strip of a length corresponding to the product of the lateral length of the recording sheet case 3 and the number of colors with fusible color inks in lengthwise successive sections in a predetermined sequence.

The manner of using the recording medium package thus constructed will be described hereinafter.

The recording sheet case 3 containing the recording sheets 1, and the ink ribbon case 4 containing the ink ribbon 2 of the recording medium package 12 are closed up in a state indicated by continuous lines in FIG. 1, and then the recording medium package 12 is detachably loaded in the printing station of a heat transfer printer, not shown. In this state, a portion of the ink ribbon 2 extended between the feed spool 10 and the take-up spool 11 is disposed opposite to the thermal print head, not shown, of the heat transfer printer the ejecting means, not shown, of the heat transfer printer engages through the recess 8 one side of the top sheet 1 facing the ink ribbon 2 among those contained in the recording sheet case 3, and the driving members of the driving mechanism, not shown, of the heat transfer printer engage the cross recesses 10a and 11a of the feed spool 10 and the take-up spool 11, respectively.

Then, the thermal print head is driven according to printing data so that the heating elements of the thermal print head are heated selectively to fuse the ink of the ink ribbon 2 so that the ink is transferred from the ink ribbon 2 to the recording sheet 1 in a pattern corresponding to the printing data.

For monochromatic color printing, for example, printing in black, the printing cycle is completed when the data to be printed on a single recording sheet has been printed on the top recording sheet 1. For multicolor printing, a printing cycle including the same printing operation and feeding the ink ribbon 2 by a length corresponding the length of each color section in the ink ribbon 2 is repeated according to the number of colors to form a multicolor print on the recording sheet 1.

For example, in printing a pattern in yellow, cyan and magenta, first, an yellow pattern is printed on the top recording sheet 1 coinciding with the opening 9 of the recording sheet case 3, and then the feed spool 10 and the take-up spool 11 are rotated in one direction by the driving mechanism to wind the used yellow section of the ink ribbon 2 on the take-up spool 11 and to located an unused cyan section of the ink ribbon 2 following the used yellow section in front of the opening 9 of the recording sheet case 3 so as to face the top recording sheet 1 carrying the yellow pattern. Then, the same printing operation is executed according to printing data representing a cyan pattern to print the cyan pattern on the top same recording sheet 1. After completing the printing operation for printing the cyan pattern on the top recording sheet 1, the feed spool 10 and the take-up spool 11 are rotated to locate an unused magenta section of the ink ribbon 2 following the used cyan section in the opening 9 in front of the opening 9 so as to face the top recording sheet 1, and then the same printing operation is executed according to printing data representing a magenta pattern to print the magenta pattern on the same top recording sheet 1. Thus, a multicolor pattern consisting of the yellow, cyan and magenta patterns is printed on the top recording sheet 1.

After the printing operation for printing a monochromatic color print or a multicolor print has been accomplished, the ejecting means is actuated to eject the printed top recording sheet 1 through the ejecting slot 7, and the ink ribbon is wound to locate an unused portion of the ink ribbon 2, when the ink ribbon 2 is a monochromatic ink ribbon, or an unused yellow section following the used magenta section of the ink ribbon 2, when the ink ribbon 2 is a three-color ink ribbon, in front of the opening 9 of the recording sheet case 3.

Since the recording sheets 1 contained in the recording sheet case 3 are biased continually toward the opening 9 by the pressing means, not shown, the next recording sheet 1 is located in the opening 9 for the following printing operation after the printed top recording sheet 1 has been ejected from the recording sheet case 3.

When all the recording sheets 1 contained in the recording sheet case 3 are printed, the entire area of the ink ribbon 2 is used simultaneously. Therefore, upon the depletion of the recording sheets 1 contained in the recording sheet case 3, the used recording medium package 12 is replaced with a new one. The used recording medium package 12 removed from the heat transfer printer is opened as indicated by alternate long and short dash lines in FIG. 1, then, the empty recording sheet case 3 is replenished with recording sheets 1, the used ink ribbon 2 is removed from the feed spool 10 and the take-up spool 11, and then the ink ribbon case 4 is replenished with a new ink ribbon 2.

Second Embodiment

Figure 3:
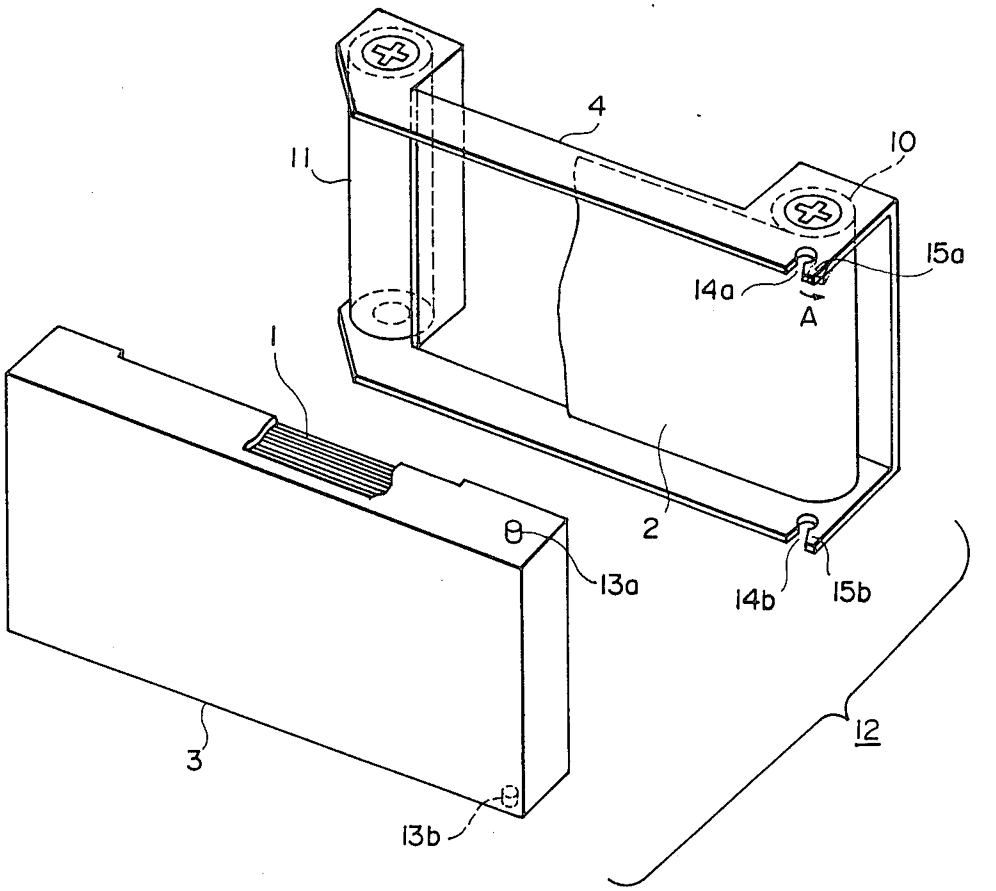
FIG. 3 is an exploded perspective view of a recording medium package, in a second embodiment, according to the present invention.

A recording medium package, in a second embodiment, according to the present invention will be described hereinafter with reference to FIG. 3 showing the recording medium package in a rear view.

A recording sheet case 3 is provided with pivots 13*a* and 13*b* in the upper an lower surfaces near the corners on one side thereof, respectively. An ink ribbon case 4 is provided with recesses 14*a* an 14*b* in the upper and lower walls on one side thereof so as to receive the pivots 13*a* and 13*b* therein, respectively, when the recording sheet case 3 and the ink ribbon case 4 are combined together. The recesses 14*a* and 14*b* each has a sectorial inlet portion and a round back portion forming a neck portion therebetween. The width of the neck portion is smaller slightly than the diameter of the pivots 13*a* an 13*b*. Accordingly, once the pivots 13*a* an 13*b* are put in the round back portions of the recesses 14*a* and 14*b*, the pivots 13*a* an 13*b* are hard to be removed from round back portions of the recesses 14*a* and 14*b*, respectively. The recording sheet case 3 of the second embodiment is the same as that of the first embodiment in construction except that the pivots 13*a* an 13*b* engage the recesses 14*a* and 14*b*, respectively and hence the description thereof will be omitted.

In assembling the recording sheet case 3 and the ink ribbon case 4, the pivots 13*a* and 13*b* are pressed against the sectorial inlet portions of the recesses 14*a* and 14*b*, respectively, whereby, the end portions 15*a* and 15*b* of the ink ribbon case 4 are bent resiliently in a direction indicated by an arrow A to a position indicated by broken lines to allow the pivots 13*a* and 13*b* to drop into the round back portions of the recesses 14*a* and 14*b*, respectively. Thus, the recording sheet case 3 is able to turn on the pivots 13*a* and 13*b* relative to the ink ribbon case 4. The recording sheet case 3 can be separated from the ink ribbon case 4 by forcibly pulling the pivots 13*a* and 13*b* from the recesses 14*a* an 14*b*, respectively. The separation of the recording sheet case 3 from the ink ribbon case 4 facilitates replenishing the recording sheet case 3 with recording sheets and replacing the used ink ribbon with a new one.

Third and Fourth Embodiments

Recording medium packages in third and fourth embodiments, according to the present invention will be described hereinafter with reference to FIGS. 4 and 5.

Figure 4:
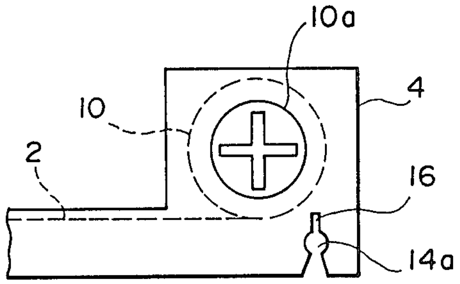
FIG. 4 is a fragmentary plan view showing a portion of an ink ribbon case employed in a recording medium package, in a third embodiment, according to the present invention.

Referring to FIG. 4, the third embodiment is substantially the same as the second embodiment in construction, except that a further improvement is incorporated therein. In the third embodiment, an ink ribbon case 4 is provided with recesses 14*a* and 14*b* in the upper an lower walls on one side thereof, and the recesses 14*a* and 14*b* each has a sectorial inlet portion, a round back portion and a further slit 16 extending inward from the round back portion. The slits 16 facilitate the recesses 14*a* and 14*b* opening when pivots 13*a* and 13*b* provided on a recording sheet case 3 are pressed thereto, respectively, so that the recording sheet case 3 and the ink ribbon case 4 can be assembled or disassembled more easily than those of the second embodiment. The slits 16 need not necessarily be a rectangular slit as shown in FIG. 4. The slits 16 may be a slit of any suitable shape, for example, a semicircular recess.

Figure 5:
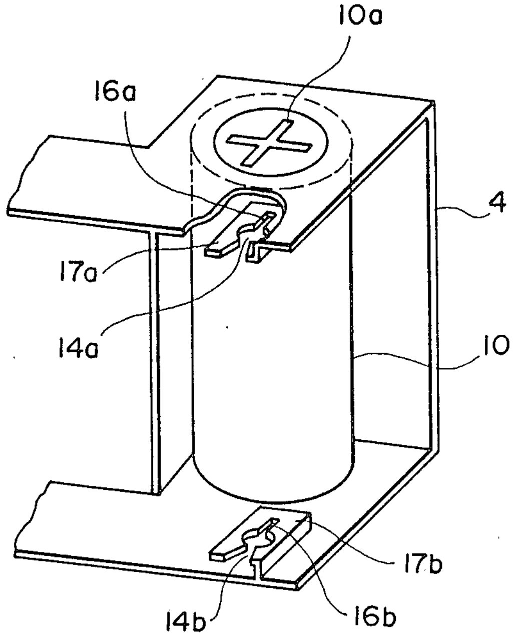
FIG. 5 is a fragmentary perspective view showing a portion of an ink ribbon case employed in a recording medium package, in a fourth embodiment, according to the present invention.

Referring to FIG. 5, the fourth embodiment is substantially the same as the third embodiment in construction, except that a further improvement is incorporated therein. In the fourth embodiment, an ink ribbon case 4 is provided with lugs 17*a* and 17*b* on the lower surface of the upper wall and on the upper surface of the lower wall thereof, respectively, and recesses 14*a* and 14*b* and slits 16*a* and 16*b* are formed in the lugs 17*a* an 17*b*, respectively. Consequently, the recording sheet case 3 and the ink ribbon case 4 can easily be assembled or disassembled, and the entrance of dust and dirt into the recording medium package through the recesses 14*a* and 14*b* and the slits 16*a* and 16*b* is prevented effectively.

Although the pivot or pivots are provided in the recording sheet case, and the hole or recesses for receiving the pivot or pivots are provided in the ink ribbon case in the foregoing embodiments, on the contrary, the pivot or pivots, and the hole or the recesses may be provided in the ink ribbon case and in the recording sheet case, respectively. When the pivots are provided in the ink ribbon case, the pivots are located on the lower surface of the upper wall and on the upper surface of the lower wall on one side of the ink ribbon case, respectively.

Furthermore, although the preferred embodiments have been described on an assumption that the ink ribbon 2 is coated with a fusible ink, the ink ribbon 2 may be coated with a hot-sublimable ink.

Still further, naturally, the heat transfer printer or the like which employs the recording medium package of the present invention is provided with a color detector for detecting the colors of the ink ribbon, a package detector for detecting the loading of the recording medium package in the printing station, and a detector for detecting the depletion of the recording sheet 1 or the ink ribbon 2.

Although the invention has been described in its preferred forms with a certain degree of particularity, obviously many changes and variations are possible in the invention in the light of the above teachings. It is therefore to be understood that the invention may be practiced otherwise than as specifically described without departing from the scope and spirit thereof.

What is claimed is:

1. A recording medium package for use in combination with a heat transfer printer having a thermal print head, which comprises:

a plurality of recording sheets;

an ink ribbon;

a feed spool wound with said ink ribbon;

a take-up spool for winding said ink ribbon;

a cassette containing the plurality of recording sheets in a pile, provided with pressing means for continually applying pressure to the pile of the plurality of recording sheets to bias the pile of the plurality of recording sheets toward the front thereof, rotatably supporting said feed spool and said take-up spool so that said ink ribbon is extended along and in front of the surface of the top sheet of the pile of the plurality of recording sheets, and adapted to be loaded in the printing station of the heat transfer printer so that the pile of the plurality of recording sheets is located opposite to the thermal print head of the heat transfer printer.

2. A recording medium package according to claim 1, wherein said ink ribbon is formed by coating one side of a base strip with a fusible ink.

3. A recording medium package according to claim 1, wherein said ink ribbon is formed by coating one side of a base strip with a hot-sublimable ink.

4. A recording medium package according to claim 1, wherein said ink ribbon is formed by coating one side of a base strip with a plurality of fusible inks of different colors in color sections successively arranged lengthwise in a fixed sequence.

5. A recording medium package according to claim 1, wherein said ink ribbon is formed by coating one side of a base strip with a plurality of hot-sublimable inks of different colors in color sections successively arranged lengthwise in a fixed sequence.

6. A recording medium package according to claim 1, wherein said ink ribbon has a sufficient length to print all the recording sheets contained in said cassette.

7. A recording medium package according to claim 1, wherein said cassette comprises:

a recording sheet case formed substantially in the shape of a box capable of containing the pile of said plurality of recording sheets, having an ejecting opening for ejecting said recording sheets one by one therethrough, a recess for exposing a portion of the top sheet among said plurality of recording sheets to the ejecting means of the heat transfer printer, and an opening formed in the front wall thereof so as to expose the top recording sheet among said plurality of recording sheets to the thermal print head of the heat transfer printer; and an ink rippon case formed substantially in the shape of a frame capable of rotatably supporting said feed spool and said take-up spool so that said ink ribbon is extended between said feed spool and said take-up spool along the surface of the top recording sheet among the plurality of recording sheets and opposite to the thermal print head of the heat transfer printer when the cassette is loaded in the printing station of the heat transfer printer, said ink ribbon case being joined pivotally at one end thereof to one end of said recording sheet case so that said recording sheet case and said ink ribbon case can be turned relative to each other.

8. A recording medium package according to claim 7, wherein said recording sheet case and said ink ribbon case can be separated from each other.

* * * * *